United States Patent [19]
Carson

[11] 3,810,312
[45] May 14, 1974

[54] ALIGNMENT INSTRUMENT

[75] Inventor: William M. Carson, Santa Ana, Calif.

[73] Assignee: Constructors Supply Company, Santa Fe Springs, Calif.

[22] Filed: Nov. 11, 1971

[21] Appl. No.: 197,879

[52] U.S. Cl............................ 33/227, 33/1 N, 33/282, 33/285
[51] Int. Cl............................................. G01c 1/00
[58] Field of Search.......... 33/281, 282, 285, 172 R, 33/172 B, 1 T, 284, 1 N, 227

[56] References Cited
UNITED STATES PATENTS

| 799,878 | 9/1905 | Stockwell | 33/281 |
|---|---|---|---|
| 1,798,324 | 3/1931 | Gross | 33/281 |
| 2,650,431 | 9/1953 | Callahan | 33/281 |
| 2,656,818 | 10/1953 | Moore | 33/172 R |
| 3,471,234 | 10/1969 | Studebaker | 33/285 |
| 1,072,577 | 9/1913 | Cook | 33/281 |
| 3,627,429 | 12/1971 | Jaenicke et al. | 33/DIG. 21 |

Primary Examiner—Robert B. Hull
Assistant Examiner—Richard R. Stearns
Attorney, Agent, or Firm—Fulwider Patton Rieber Lee & Utecht

[57] ABSTRACT

In an alignment instrument of the type in which a support or fixed instrument portion pivotally mounts a movable instrument portion, which may be a telescope, laser tube or the like, the movable portion is swingable through an arc from a reference axis to a second axis in alignment with a point of interest. A device capable of responding to the accompanying change in linear distance between the fixed and movable instrument portions is mounted to such portions and undergoes relative linear movement as the movable portion undergoes angular movement. According to this invention, the mountings at the ends of the device are pivotable and are located equidistant from the pivot axis of the movable portion. This arrangement minimizes the discrepancy inherent in measuring relative angular movement between the instrument portions by measuring the attendant change in linear distance between them.

5 Claims, 4 Drawing Figures

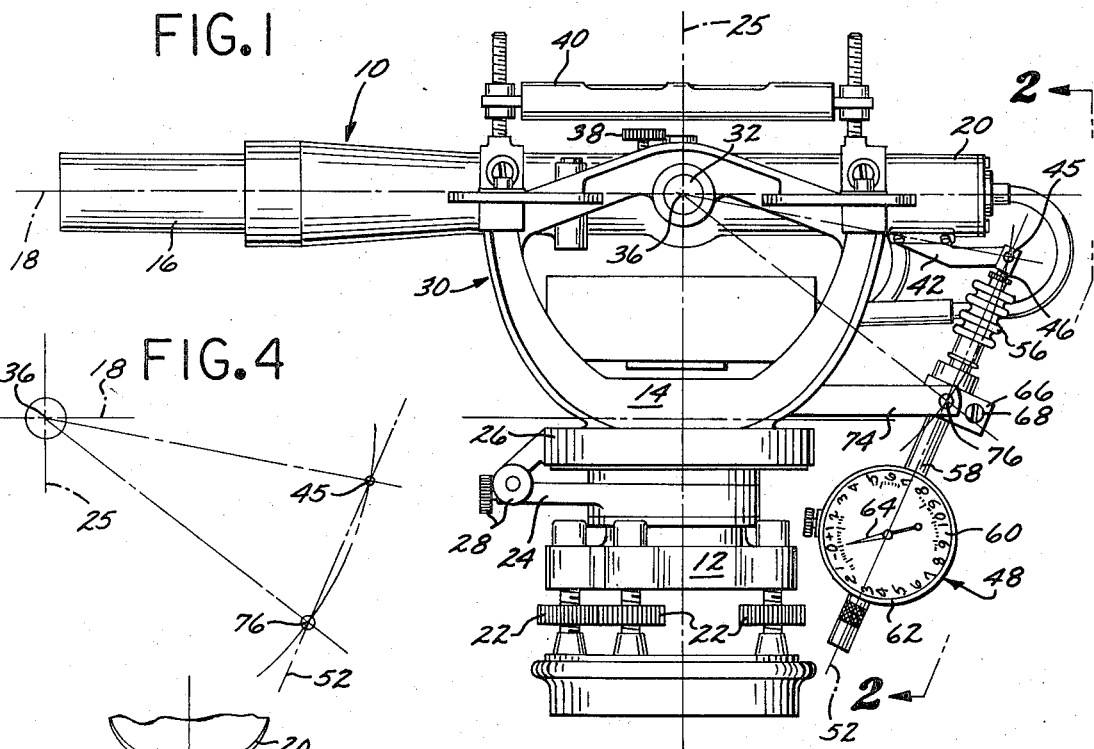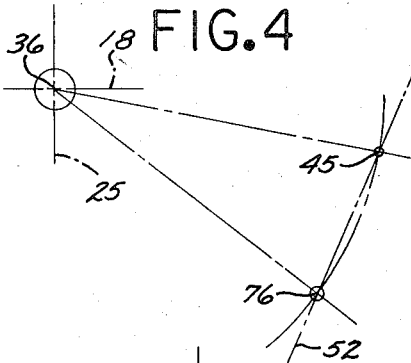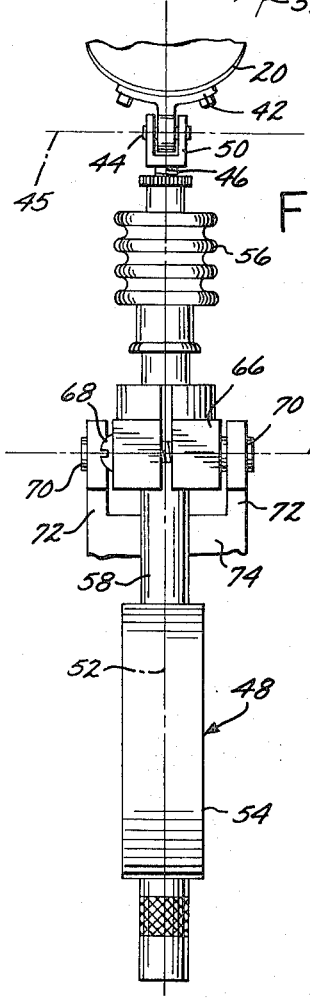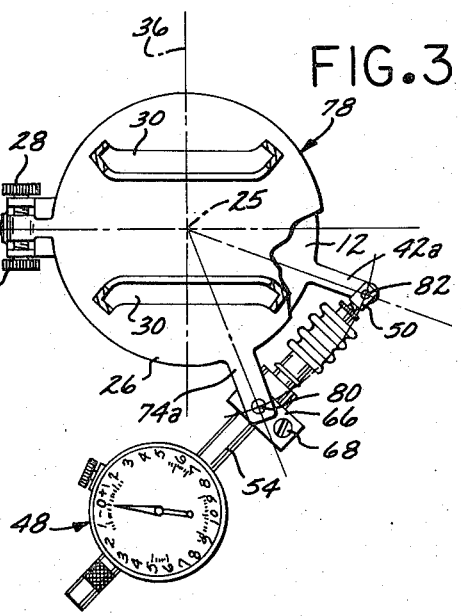

ALIGNMENT INSTRUMENT

BACKGROUND OF THE INVENTION

1. Field of the Invention

The present invention relates to an alignment instrument and more particularly to an alignment instrument in which the extent of relative angular movement between fixed and movable portions of the instrument is determined by a device capable of measuring the accompanying change in linear distance between such portions.

2. Description of the Prior Art

The usual alignment instrument, including a surveyor's transit or the like, for measuring horizontal or vertical angles, or for prolonging a straight line, establishing a level line of sight, or the like, includes a leveling head attached to a tripod and adjustable for establishing the vertical axis. The transit also includes a graduated horizontal circle surmounted by an alidade with a graduated vertical circle. Verniers are appropriately located for cooperation with the graduated horizontal and vertical circles to yield a relatively precise indication of the horizontal and vertical angles of interest. However, the graduations on the circles are sometimes difficult to read, and the verniers associated with the circles are confusing to some people and present a tedious and time consuming task subject to human error. Moreover, even when a correct reading is obtained it is often not nearly precise enough for many applications.

A means is needed which will provide a direct indication of the extent of movement between the relatively moving parts of the transit. The arcuate character of the movements involved does not present an easy measurement for the usual precision instruments which are designed for measuring the extent of linear travel.

Although a surveyor's transit has been referred to, the same problems are true of analogous surveying instruments, such as a surveyor's level and various other alignment instruments for prolonging a straight line, establishing a level line of sight, etc.

SUMMARY OF THE INVENTION

According to the present invention, an alignment instrument is provided having a fixed portion and a movable portion characterized by a longitudinal first axis. The movable portion is mounted to the fixed portion for movement about a second axis extending transversely of the first axis. In a typical embodiment the first axis is defined by an optical or laser beam tube which is pivotable about a second axis.

The relatively movable sections of a device responsive to a change in linear distance, such as a usual dial indicator are pivotally connected between the fixed and movable portions of the surveying instrument. The axes of these pivotal connections are equidistant from the aforementioned second axis. With this arrangement, pivotal movement of the sighting tube, for example, about the second axis causes the associated portion of the dial indicator to move arcuately with it. The other pivot point of the dial indicator pivots enough to allow such arcuate movement but does not itself travel in an arcuate path. However, the amount of measurement error inherent in this arrangement is minimized because of the equidistant location of the pivot points relative to the second axis, and because this equidistant location is maintained by the pivotal connections of the indicator to the instrument. Moreover, the error is very small and more than offset by the high degree of accuracy obtainable with a dial indicator compared to a vernier device.

The dial indicator is utilized in various embodiments to measure horizontal angles or vertical angles or a combination of both merely by relocating and making its two points of pivotal attachment equidistant from the axis about which the movable portion of the surveying instrument is swung.

Other objects and features of the invention will become apparent from consideration of the following description taken in connection with the accompanying drawings.

BRIEF DESCRIPTION OF THE DRAWINGS

FIG. 1 is a side elevational view of an alignment instrument according to the present invention, the supporting structure or tripod being omitted for brevity;

FIG. 2 is an enlarged partial view taken along the line 2—2 of FIG. 1;

FIG. 3 is a partial plan view of a second embodiment of the present invention; and FIG. 4 is a diagrammatic representation of the arcuate path of movement of the movable portion of the surveying instrument, and the axis of the associated dial indicator.

DESCRIPTION OF THE PREFERRED EMBODIMENTS

Referring now to the drawings, and particularly to FIGS. 1 and 2, there is illustrated an alignment instrument, surveying instrument or level 10 which is conventional in most respects, except for the read-out device, as will be seen. The instrument 10 comprises, generally, a leveling head 12 having a foot plate adapted for mounting upon a usual tripod (not shown); a trunnion mount 14 carried by the leveling head 12 for rotation about a vertical axis 25. Once the azimuth is established, the leveling head 12 and trunnion mount 14 constitute the relatively fixed portion of the surveying instrument 10.

The movable portion of the instrument 10 comprises an elongated tube 16 whose axis 18 constitutes the sighting axis. The tube 16 can be an optical instrument such as a telescope, but in the present instance it is a laser beam tube of generally conventional construction. A projector 20 is provided at the rearward end of the tube 16 to project the beam of light out of the opposite end of the tube 16.

The leveling head 12 is also of conventional construction and includes a plurality of leveling screws 22 which are adjusted to vertically align the instrument 10. The head 12 rotatably mounts a collar 24 which is coupled to the horizontal limb or base 26 of the trunnion mount 14. As is well known to those skilled in the art, operation of usual clamp and adjusting screws 28 enables the collar 24 to be clamped in any of its rotated positions and thereafter made to move slowly through a small arc about the axis 25. This establishes the azimuth or horizontal angle of the instrument 10.

A pair of vertically oriented standards or supports 30 are secured in spaced apart relation to the limb or base 26, the upper portions of the supports 30 supporting a pair of aligned, spaced apart trunnions 32 which are integral with the tube 16 for pivotal movement of the tube 16 about a horizontal trunnion axis 36 which intersects both the instrument axis 18 and the vertical axis 25. Movement of the tube 16 about the trunnion axis 36 is accomplished by operation of an adjusting screw 38 which is threaded into cooperating portions of the tube 16 and mount 14. Thus, rotation of the screw 38 changes the inclination or declination of the tube 16 about the horizontal trunnion axis 36.

A spirit level or bubble vial 40 is mounted to the top of the tube 16 to indicate when the tube axis 18 is horizontal.

The structure thus far described is generally conventional, forming a part of most surveyors' levels. Next will be described the manner in which certain of these components are modified and certain others are added, according to the present invention. More particularly, an upper support bracket 42 is rigidly secured by suitable fasteners to the underside of the rearward extremity of the projector 20. The bracket 42 projects rearwardly and is provided at its rearward extremity with a transverse opening which receives a transverse pivot pin 44. The pin 44 extends through the sides of a clevis 50 which is threaded to the end of the stem section 46 of a device responsive to a change in linear distance, such as a conventional dial indicator 48, as best viewed in FIG. 2. The pin 44 thus defines an axis 45 parallel to the axis 36 for pivotal movement of the stem section 46 relative to the movable portion or tube 16.

The stem section 46 is characterized by linear movement along a stem axis 52 and telescopes within a larger diameter barrel 58 of the relatively fixed indicator section 54. The telescoping portions of the stem section 46 and barrel 58 are covered by a protective rubber boot 56.

The indicator 48 includes a dial 60 mounted to the barrel 58 and provided on its face with indicia showing the extent of movement of the stem section 46 relative to the indicator section 54. The particular indicia in the embodiment of FIGS. 1 and 2 are tenths of a percent grade, one percent being a 1 foot change in elevation in 100 feet. Of course, the dial face can be provided with different indicia, if desired, such as degrees.

In all respects the dial indicator 48 is conventional and identical to the usual machinist's dial indicator. It includes an annular collar 62 to zero the readings, and a needle 64 suitably coupled to the inner extremity of the stem section 46 so as to sweep across the dial face in correspondence will linear movement of the stem section 46.

The indicator barrel 58 is received within the central opening of a split collar or pivot block 66. A screw 68 passes through the split, confronting portions of the block 66 to fixedly clamp the barrel 58 in position. The pivot block 66, in turn, is provided with a pair of aligned transverse openings which receive a pair of pins 70. These pins 70 extend into complemental openings in a pair of spaced apart arms 72 formed in the rearwardly projecting extremity of a lower support bar or bracket 74. The opposite extremity of the bracket 74 is rigidly secured to the trunnion mount base 26. The pins 70 define a horizontal pivot axis 76 parallel to the trunnion axis 36 and about which the indicator section 54 is pivotable.

The parallel axes 45 and 76 are equidistant from the trunnion axis 36, the distance measuring 5 inches, for example. Assuming the needle 64 of the dial indicator 48 rotates one-half revolution for every 0.050 inch of linear movement of the stem section 46, the 5 inch distance thereby provides a 1 percent grade dial indication for every half revolution of the needle 64.

There is inherent in the arrangement just described a theoretical error of five millionths of an inch, assuming that the limit of movement of the tube 16 about the trunnion axis 36 is within a range of plus or minus 8 percent grade. This is because movements of the indicator stem section 46 do not exactly correspond to the arcuate movement of the axis 45 as the tube 16 pivots about the trunnion axis 36. Instead, the indicator 48 responds linearly to the change in proximity of the axes 45 and 76 along the indicator axis 52, as best seen in FIG. 4. However, an error of five millionths of an inch is negligible in comparison to the inaccuracies inherent in reading the vertical circle plate indicia and vernier markings of prior art surveyors' levels. Moreover, the inherent error is more than offset by the much greater accuracy and convenience of using the dial indicator 48. The present instrument easily indicates with accuracy one tenth of one percent grade, which is a common amount of fall of a drain line in construction work.

The embodiment of FIGS. 1 and 2 is analogous to a conventional surveyors' level for measuring vertical angles. In FIG. 3 is illustrated a surveying instrument 78 which performs the surveyor's transit function of indicating horizontal angles or azimuth. It uses the dial indicator 48 mounted in a somewhat different manner compared to the embodiment of FIGS. 1 and 2 but is otherwise very similar. Consequently, like numerals will be employed for substantially identical parts, and like numerals with the letter "a" will be employed to designate analogous parts. In the embodiments of FIG. 3 the relatively fixed portion of the instrument 78 is constituted by trunnion mount base 26. It is provided with an integral, radially extending bracket 74a having a projecting extremity identical to the bracket 74 of the embodiment of FIGS. 1 and 2. That is, the bracket 74a supports a pair of pins which extend into a pivot block 66 to pivotally support the dial indicator section 54 for pivotal movement about a vertical pivot axis 80.

The relatively movable portion of the instrument 78 is constituted by the leveling head 12, and its upper portion is provided with an integral, radially extending bracket 42a. The projecting extremity of the bracket 42a includes an opening through which a pin extends for supporting the clevis 50 upon the bracket 42a for pivotal movement about a vertical pivot axis 82. The axes 80 and 82 are parallel to and equidistant from the vertical axis 25 about which the tube 16 is swung for effecting changes in azimuth.

The operation of the dial indicator 48 in the embodiment of FIG. 3 is identical to its operation in the embodiment of FIG. 1, except that the indicia are such as to display the changes in azimuth or horizontal angle as the tube 16 is moved relative to the leveling head 12 and about the vertical axis 25.

The embodiments of FIGS. 1 and 3 can be combined in one instrument, if desired, in which case the pair of indicators would separately indicate azimuth and elevation.

In all embodiments, use of a dial indicator or other device responsive to linear distance changes provides an easy and very accurate means for determining angular changes in position of the tube 16 relative to a particular reference axis. The precision characteristics of dial indicators are uniquely made available in the present surveying instruments by establishing a mounting system which utilizes the linear measuring capability of the dial indicator while yet minimizing the theoretical error inherent in such a system. This eliminates the tedious prior art practice of reading graduated horizontal and vertical circles, verniers, clinometers, and the like.

Various modifications and changes may be made with regard to the foregoing detailed description without departing from the spirit of the invention.

I claim:

1. In an alignment instrument including a fixed portion, a movable portion having a first axis, and means mounting said movable portion to said fixed portion for relative angular movement about a second axis extending transversely of said first axis, the improvement comprising:

indicator means including a dial indicator having generally oppositely disposed indicator and stem sections one of which is pivotally attached to said fixed portion and the other of which is pivotally attached to said movable portion, the points of said pivotal attachments lying in a plane substantially perpendicular to said second axis and being equidistant from said second axis at all times, but changing in linear distance from each other responsive to said relative angular movement of said movable portion, said indicator means being responsive to changes in said linear distance to indicate said relative angular movement.

2. An alignment instrument according to claim 1 wherein said movable portion includes a laser beam tube.

3. An alignment instrument according to claim 1 wherein said second axis is generally horizontal whereby said alignment instrument constitutes a surveyor's transit.

4. An alignment instrument according to claim 1 wherein the scale of said dial indicator is calibrated in percent grade.

5. An alignment instrument according to claim 1 wherein said second axis is generally vertical whereby said alignment instrument constitutes a surveyor's level.

* * * * *